United States Patent [19]

Kosaka

[11] Patent Number: 4,647,073
[45] Date of Patent: Mar. 3, 1987

[54] CLAMPING DEVICE FOR UNDERGROUND PIPES

[76] Inventor: Etsuji Kosaka, 3-3, Shiomidai, Isogo-ku, Yokohama-shi, Kanagawa-ken, Japan

[21] Appl. No.: 749,104

[22] Filed: Jun. 26, 1985

[51] Int. Cl.⁴ ............................................. F16L 55/00
[52] U.S. Cl. .................................... 285/23; 285/197; 285/198; 137/318
[58] Field of Search ................ 285/197, 198, 199, 23; 137/318

[56] References Cited

U.S. PATENT DOCUMENTS

| | | | |
|---|---|---|---|
| 204,730 | 6/1878 | Hawkes | 285/197 X |
| 691,246 | 1/1902 | Cram | 285/198 X |
| 1,326,392 | 12/1919 | Combs | 285/197 |
| 2,230,046 | 1/1941 | Curtis | 403/330 X |
| 2,736,335 | 2/1956 | Webber | 137/318 |
| 3,815,624 | 6/1974 | Mullins | 137/318 |
| 4,168,089 | 9/1979 | Hulslander | 285/197 |

Primary Examiner—Richard J. Scanlan, Jr.
Assistant Examiner—Joseph A. Fischetti
Attorney, Agent, or Firm—McGlew and Tuttle

[57] ABSTRACT

A clamping device for connecting a branchpipe to a main pipe buried underground, has a main body with a lower side having a curved surface for engaging the main pipe and, at the same time, is provided with a connection port for a branched coupling. Arms are supported by sections of the body on both sides of the connection port cand on the upper side of the main body. These arms are extended downwardly so as to hold the main pipe and move for free rotation with respect to the support sections. Arm retainers are idly supported at the centers by bolts which are screwed into threaded holes provided on a midplane of the support sections of the main body. The retainers have pushing sections formed on both their ends for pushing the arms from above, at external sides of the support sections. Only a small working hole must be excavated for connecting the branched pipe to the main pipe since the clamping device can be positioned and tightened from ground level.

5 Claims, 17 Drawing Figures

CLAMPING DEVICE FOR UNDERGROUND PIPES

FIELD AND BACKGROUND OF THE INVENTION

The present invention relates to a clamp device which is used in connecting a newly laid branch pipe to a pipe which is buried under the ground, for instance, a gas main or water main pipe.

In connecting a branch pipe to a gas main pipe (or water main pipe), a branched coupling is fitted to a section of the main pipe. In the case of a cast gas main pipe, the gas main pipe is provided with a threaded hole and the branched coupling is screwed directly into this hole for connection.

Figure 1:
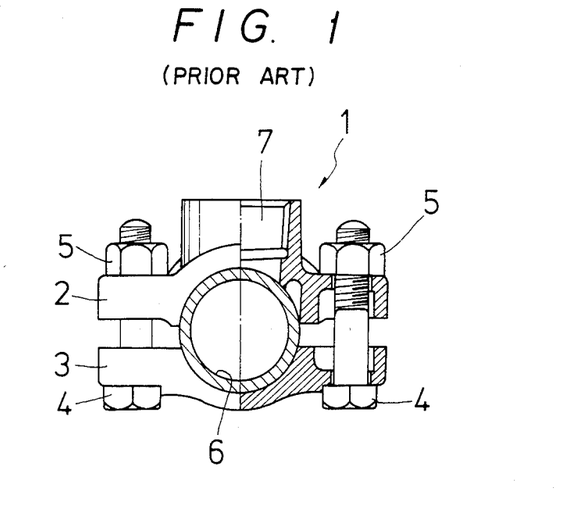
FIG. 1 is a partial sectional view of a conventional clamping device.
Figure 2:
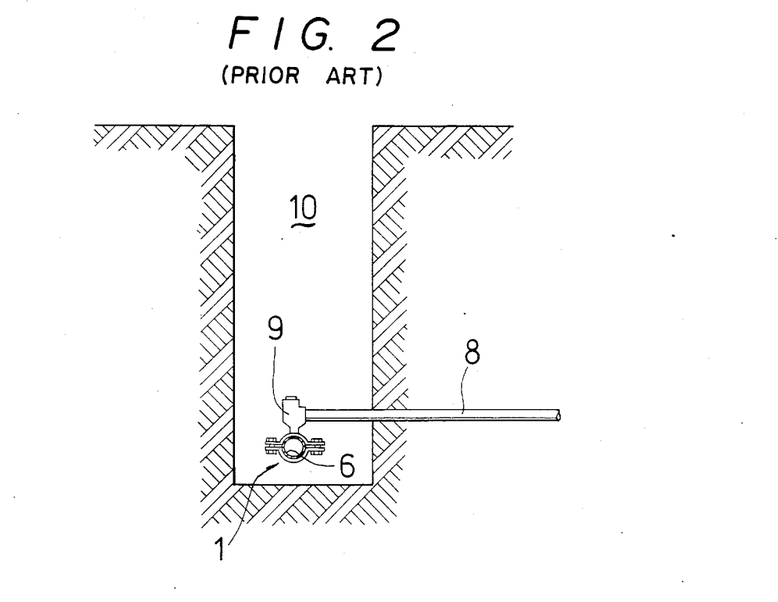
FIG. 2 is an explanatory view of a branch connection method using the conventional clamping device.

If, however, the gas main pipe is made of steel, this pipe itself has a thinner thickness, and hence to join the branched coupling directly to it, as in the case of a cast pipe, is problematic with respect to strength. For this reason, a clamping device, having a construction as shown in FIG. 1, is now being employed. This clamping device 1 consists of two split structures which are the upper frame 2 and the lower frame 3 that are secured by bolts 4 and nuts 5. To connect this type of clamping, a vertical hole 10, as shown in FIG. 2, is excavated and the gas main pipe 6 is exposed. A worker enters the vertical hole 10, places the upper frame 2 on the gas main pipe 6, positions the lower frame 3 under the pipe, securing both these components with bolts 4 and nuts 5, and then connects the branched coupling 9 to a connection port 7 of the upper frame 2. The worker then connects the branch pipe 8 to the branched coupling 9.

In the connection work for this conventional clamping device, as clearly seen from the aforesaid working example, one worker at least must enter the vertical hole to perform the work. This fact, however, had disadvantages which are listed below:
(a) Trouble and time are consumed for excavating the vertical hole.
(b) Trouble and time are also necessary for burying the vertical hole, and in the case where a paved street is over the point of connection, a large repair trace remains on the surface.
(c) If the space is not available to excavate the vertical hole large enough to accommodate a worker, the branched pipe must be extended all the way to the place where such space is available.

SUMMARY OF THE INVENTION

The present invention provides the kind of clamping device wherein all work can be done from gound level without entering the vertical hole, in order to secure the clamp.

Accordingly, it is an object of the invention to provide a clamping device which comprises a main body having a lower surface that is curved so as to closely engage the gas main pipe (or water main pipe) which is buried under ground, and at the same time is provided with a connection port for a branched coupling at its center. Arms for clamping the pipe, are supported by rotary shafts fitted to support sections formed on both sides of the main body. These arms extend downward and partly around the pipe for holding the pipe and move for free rotation with the rotary shafts as their centers of rotation. Arm retainers are idly supported by bolts screwed into threaded holes provided on a midplane of the support sections. These retainers having pushing sections formed on both sides thereof for pushing the arms from above, outside of the support sections. This clamping device is fitted to the tip of a rod-shaped tool with the arms in a slackened state. Device is lowered into a vertical hole, and the arms of this lowered clamping device are moved using the tool, to hold the main pipe. When the clamping device has been set onto the main pipe in this way, a wrench is lowered, for instance, for tightening up the bolts of the arm retainers. In this way, the pushing sections at both the ends of the arm retainers can hold the arms. By this holding action, the arms can strongly hold the main pipe. As a result, the clamping device is fastened to the main pipe. Upon finishing the fastening of the clamping device, the wrench and the tool are detached from the device and the branched coupling is lowered onto the connection port of the main body from ground level, also using a tool. The branched coupling is then connected to the connection port of the clamping device. When the connection of the branched coupling has been completed, the branch pipe is connected to the branched coupling. A drilling machine is then lowered onto the branched coupling through a top port thereof, and a hole saw is used to cut the main pipe through this branched coupling and to thus perform a drilling operation to drill a hole in the main pipe. Once the hole has been drilled in the main pipe, the fluid inside the main pipe enters into the branched coupling through this hole and flows toward the branched pipe. The drilling machine having completed the drilling operation is pulled out of the hole and to gound level. A plug is then screwed over the top port of the branched coupling to close the port.

After connecting the branch pipe as mentioned above, soil and sand is refilled into the vertical hole and the repair work is ended.

The various features of novelty which characterize the invention are pointed out with particularity in the claims annexed to and forming a part of the disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 3:
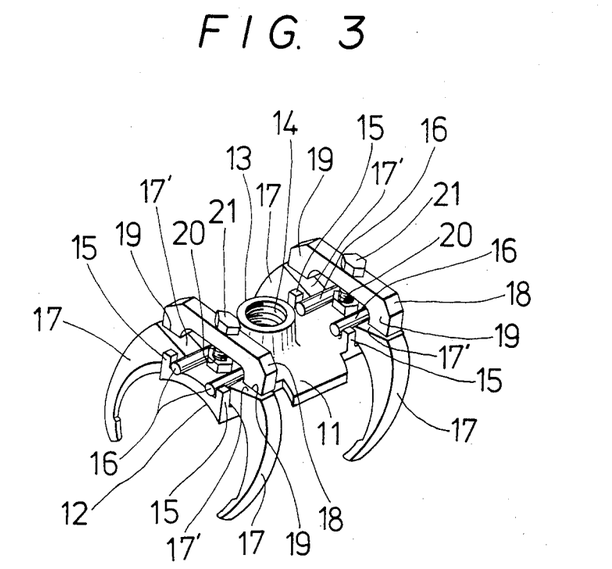
FIG. 3 is a perspective view of the clamping device of the present invention.
Figure 4:
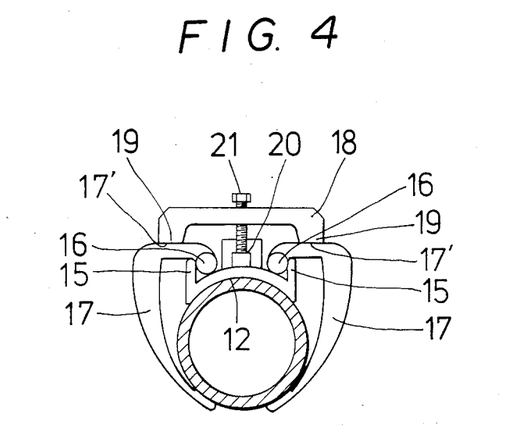
FIG. 4 is a lateral side view of the clamping device shown in FIG. 3.

The fundamental clamping device which puts this invention into practical application is shown in FIG. 3 and FIG. 4.

In these Figures the inventive clamping device is shown to have a main body 11 with a curved surface formed on a lower side thereof for closely engaging the outer surface of a main pipe. The body 11 has a connection port 13 provided to the center thereof with a screw thread 14 threaded inside this connection port 13. Further, on the circumference of connection port 13 in the curved face 12, an O ring of sealing material is fitted for the sake of enhancing the sealing between the port and the pipe.

Projections 15 are provided on the upper surface of main body 11, at support sections of the main body on both sides of the aforesaid connection port 13. Rotary shafts 16 are fitted into the aforesaid support sections and are held for pivotal movement by projections 15. At the right and left, arc-shaped arms 17 are provided which are fixed to shafts 16. The arms 17 can be rotated freely with their rotary shafts 16 as their centers of rotation.

Arm retainers 18 with build up pushing sections 19 engage on shoulder sections 17' (i.e. outside areas from the rotary shafts 16) of arms 17 on the right and left and are supported idly or freely by bolts 21 screwed into thread holes 20 provided at a midway location between the right and left arms 17 and in the body 11.

FIGS. 5 through 8 show an example for fitting the clamping device, having the aforesaid structure, to a gas main pipe.

Figure 5:
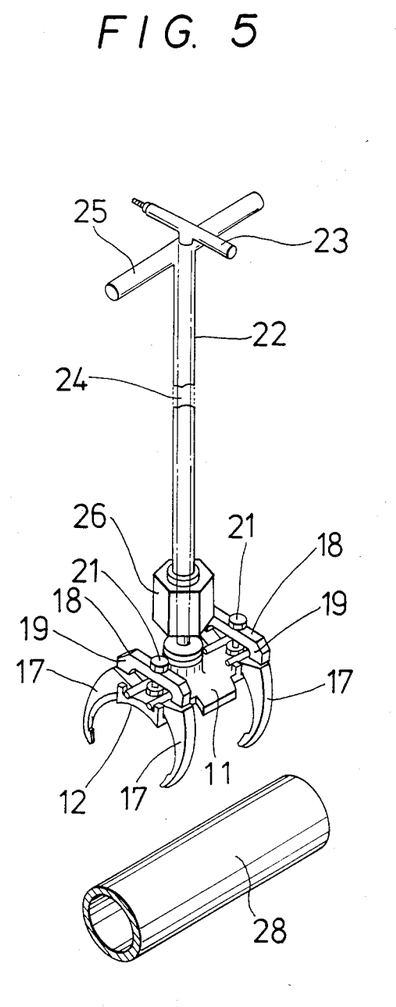
FIGS. 5 through 8 are explanatory perspective views of the working operations for fastening the clamping device of this invention to a gas main pipe inside a vertical hole.
Figure 6:
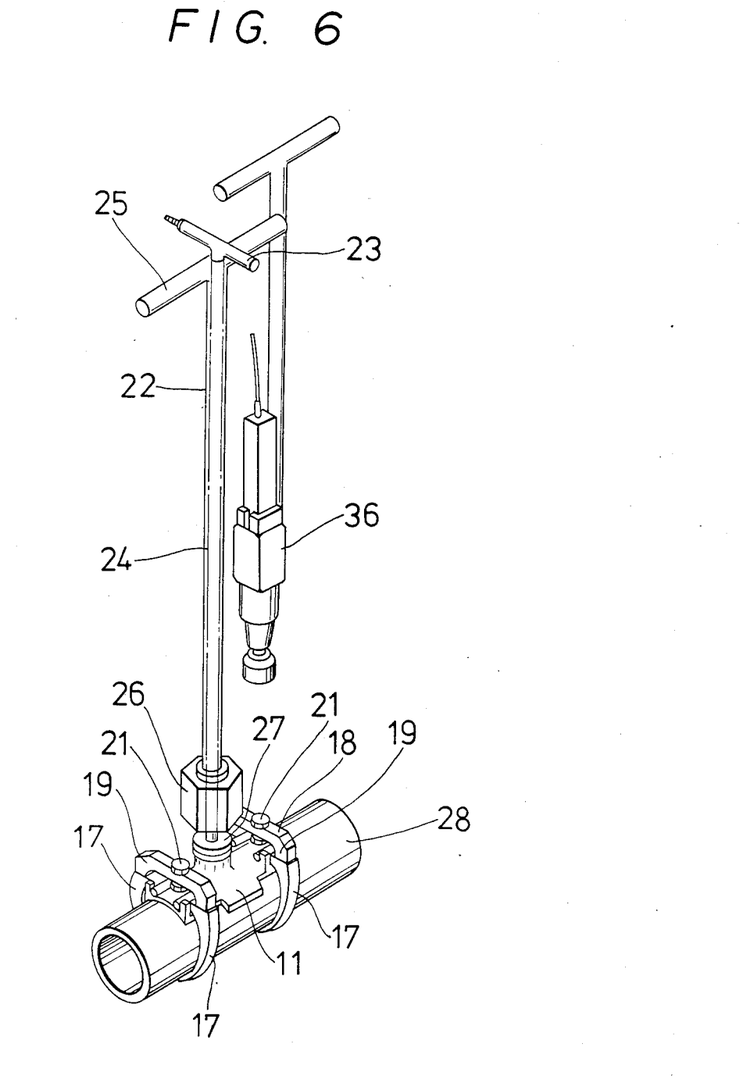
Figure 9:
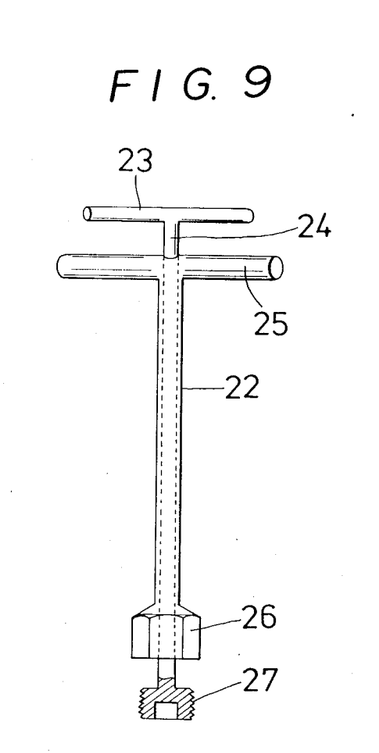
FIG. 9 is a lateral side elevational view of a tool for lowering the clamping device into the vertical hole.

First, the threaded portion 27 of a tool 22 shown in FIG. 9, is screwed into the connection port 13 of the main body 11 to install the clamping device at the end of the tool. The clamping device is then lowered into a vertical hole as illustrated in FIG. 5. At this time, the arms 17 are in a loose state. The clamping device is then placed onto the gas main pipe 28 by utilizing the looseness of arms 17. A handle 23 of tool 22 is held with the connection port 13 of the main body being kept in a vertical direction. A wrench 36 is then lowered from ground level (FIG. 6) and used to tighten the bolts 21. When the bolts 21 are tightened in this way, the shoulder portions 17' of arms 17 are pushed downwardly by the pushing sections 19 of arm retainers 18. As a result, the arms 17 rotate with their free ends sliding against the sides of gas main pipe 28 with the rotary shafts 16 as their centers of rotation and hold the gas main pipe 28. Consequently, the clamping device is fastened to the gas main pipe 28. Shoulder portions 17' are between the shafts 16 and the free ends of arms 17.

Figure 7:
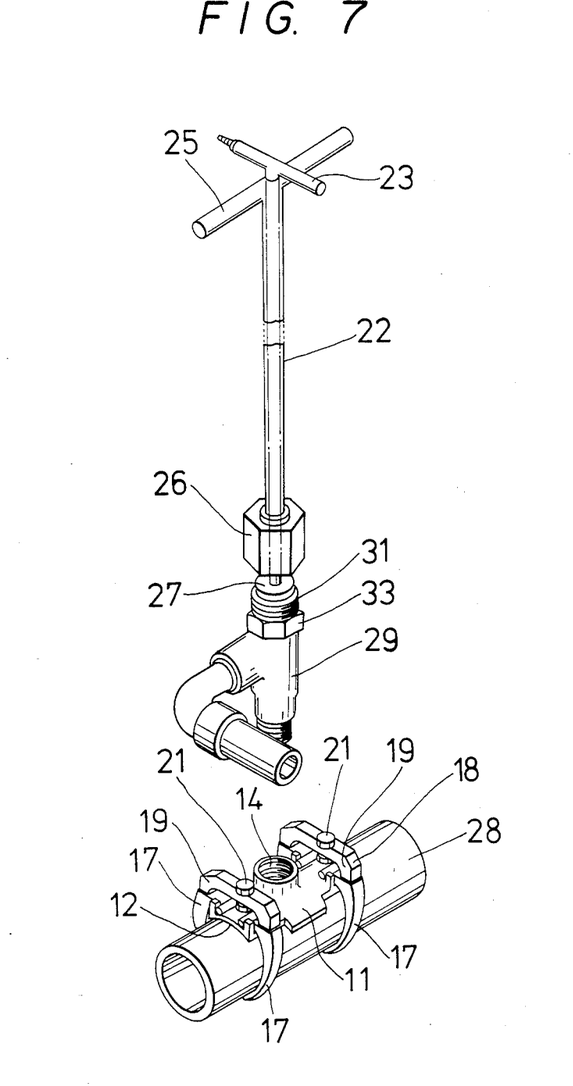
Figure 8:
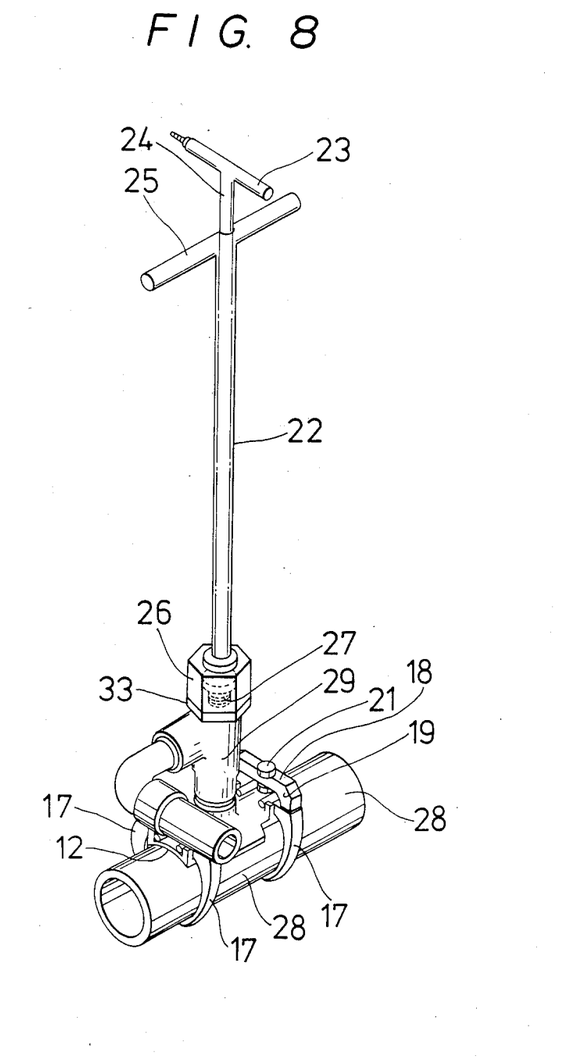
Figure 10:
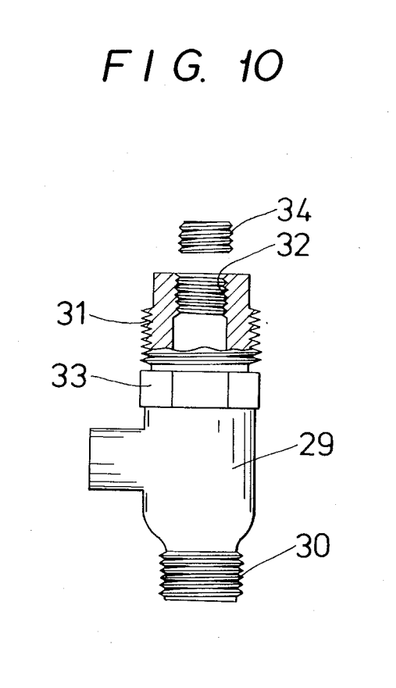
FIG. 10 is a lateral side view, partly in section, of a coupling.

When fastening of the clamping device to the gas main pipe 28 has been completed, the tool 22 is removed from the connection port 13 of the clamping device and is lifted up to ground level. Then the threaded portion 27 is screwed to the upper port 32 of a branched coupling 29 shown in FIG. 10 to hold the branched coupling 29 which is then lowered down into the vertical hole as illustrated in FIG. 7. While retaining the handle 23 as shown in FIG. 8, a cap nut 26 is fitted to the hexagonal section 33 of the branched coupling 29. A handle 25 of tool 22 is then rotated to screw the threaded portion 30 of branched coupling 29 into the thread 14 provided inside the connection port 13 of main body 11 and thus install the branched coupling 29 onto the clamping device as illustrated in FIG. 8. When the aforesaid installation has been completed, the branch pipe is connected to the port of the elbow which has previously been connected to the branched coupling 29. The tool is then detached from the branched coupling and a drilling bit of a drilling machine (not shown) is lowered into the upper port 32 of branched coupling 29, to perform the drilling operation on the gas main pipe 28. Then the drilling machine is pulled out of the branched coupling and a plug 34 is screwed into the upper port 32 of branched coupling 29 to close it. The assembly is then buried with soil and sand to fill the vertical hole and end all the required works.

FIG. 11 through FIG. 17 show another practical example of the invention. If the arms 17 are loose, the arms, may not open and the clamping device cannot sometimes be placed well onto the gas main pipe 28 when the device is lowered and installed onto the gas main pipe in the vertical hole, so this inventive example incorporates means for solving this problem.

Figure 11:
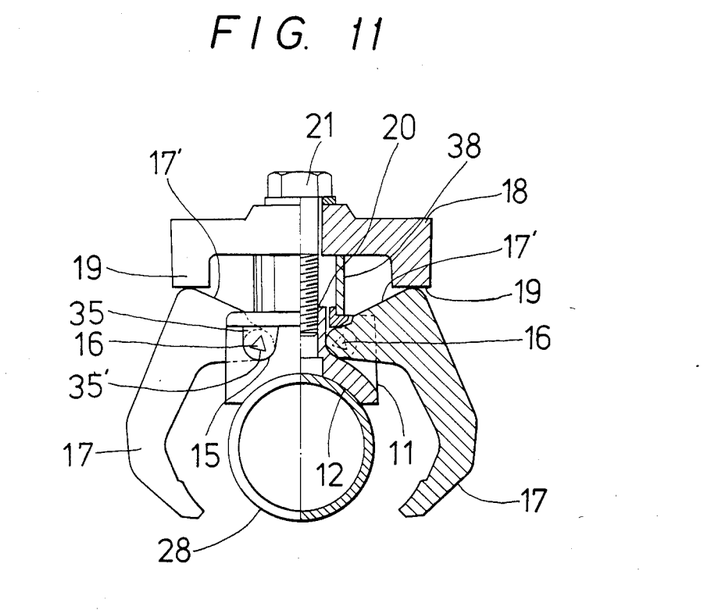
FIG. 11 is a partial sectional view of the clamping device where the moments in an opening direction operate on the arms.
Figure 12:
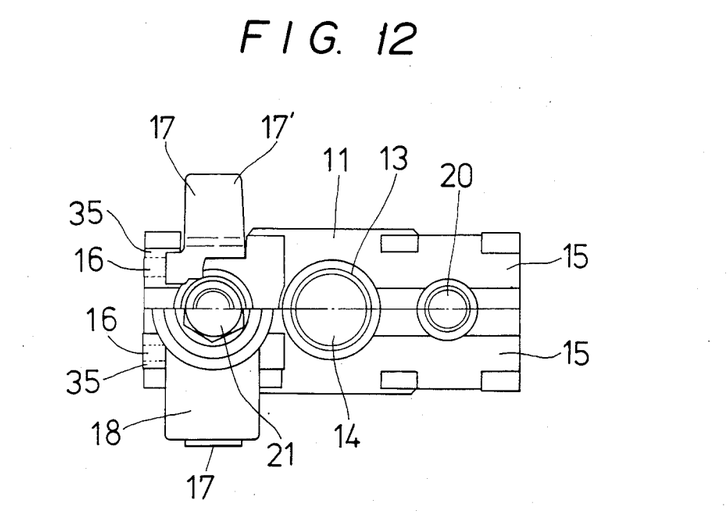
FIG. 12 is a plan view of the clamping device which is shown in FIG. 11.
Figure 13:
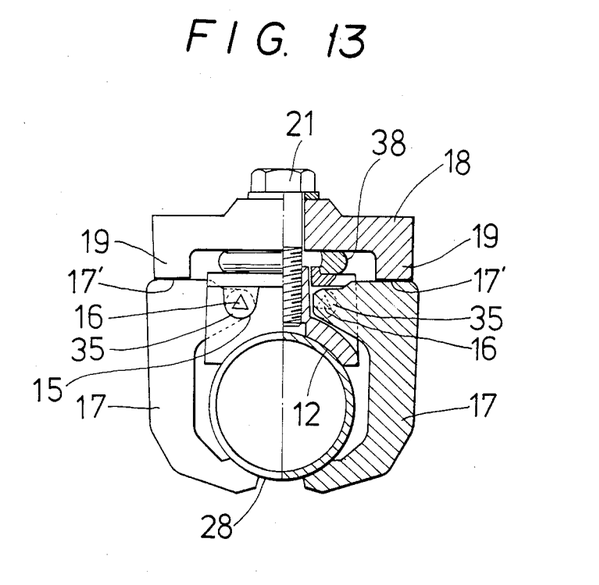
FIG. 13 is a sectional view in a state where the clamping device of FIG. 11 has been fastened to the gas main pipe.
Figure 14:
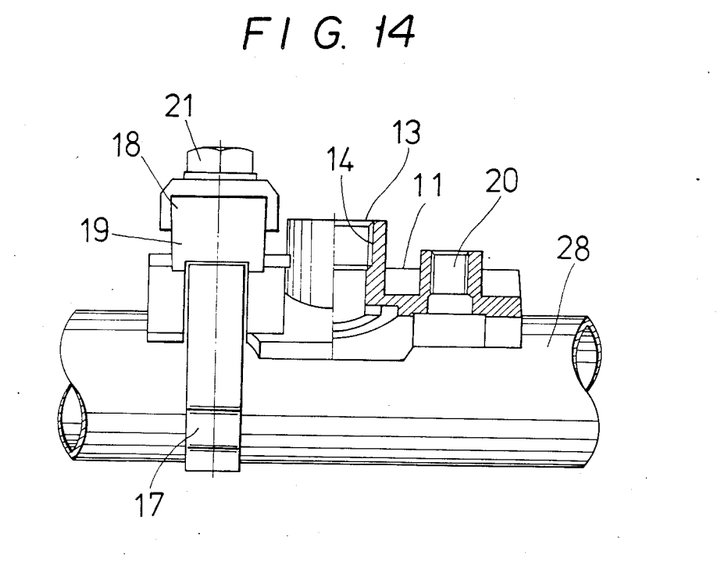
FIG. 14 is a lateral side view, partly in section, of the clamping device shown in FIG. 13.
Figure 15:
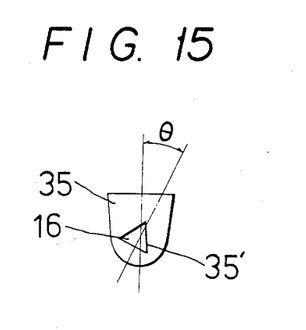
FIG. 15 is a front view of an "A" type elastic member.
Figure 16:
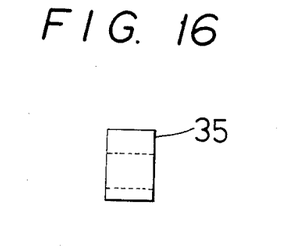
FIG. 16 is a lateral side view of the "A" type elastic member.

These means are to fit an "A" shaped elastic member 35 made of rubber as shown in FIG. 15, onto the support sections with projections 15 of main body 11. These members 35 are provided with triangular non-circular holes 35' and rotary shafts 16 of arms 17 are of triangular form too so as to be inserted into the holes 35' of the "A" shaped elastic members 35 and to hold the arms 17 open, when they are unloaded. As illustrated in FIG. 11, by making the angle θ shown in FIG. 15, a correct magnitude, arms 17 are elastically held open as shown in FIG. 11.

As a result, since the arms 17 of the clamping device can be, in their opened state, lowered into the vertical hole from the ground and further can be placed onto the gas main pipe 28, the aforesaid inconvenience due to the loose state of arms 17, can be eliminated.

Figure 17:
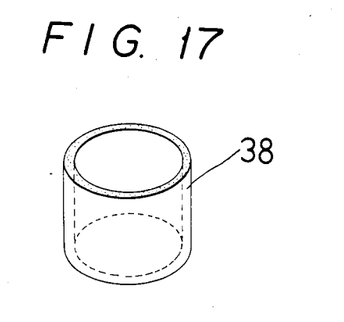
FIG. 17 is a perspective view of a "B" type elastic member.

What's more, since the arm retainers 18 are idly or freely connected to the bolts 21, their weight is imposed on the shoulders 17' of arms 17. Moreover, the elastic members 35, into whose triangular holes 35' rotary shafts 16 of arms 17 are inserted, have been fitted only from above to the support sections 15 so that there is a fear for them to escape upwardly. The arms are therefor retained with a "B" type elastic member or sleeve 38 which is shown in FIG. 17.

In addition, the coupling between rotary shafts 16 and the "A" type elastic members 35 can be of square shape instead of the triangular shape, in section, as shown in the illustrated example.

As mentioned above, since, in this invention, the clamping device can be fastened to the gas main pipe by utilizing the tool from ground level and all work for connecting the branched coupling to the clamping device and also for the drilling operation can be done from ground level, there is no need for excavating a large vertical hole for a worker to enter for doing this work as was done in the past.

Consequently, the vertical hole can be excavated as small as possible which shortens the trouble and time for excavation with the repaired trace also being smaller, and the branch pipe conenction being made at almost any location.

While specific embodiments of the invention have been shown and described in detail to illustrate the application of the principles of the invention, it will be understood that the invention may be embodied otherwise without departing from such principles.

What is claimed is:

1. A clamping device for connecting a branched coupling to a main pipe having an outer cylindrical contour, comprising:

a main body having a lower curved surface shaped to engage an upper part of the outer contour of the main pipe, said main body having a central threaded connection port for receiving the branched coupling and a support section on opposite sides of said connection port, each support section being defined on an upper surface of said main body and having a pair of upwardly open recesses, said main body having a threaded bore between each pair of recesses of each one of said support sections;

a pair of clamping arms for each support section, each clamping arm having a rotation shaft connected thereto at one end thereof, with each rotation shaft being mounted for free rotation in a respective recess of said support sections to permit rotation of said pairs of clamping arms between open and closed portions, each arm having an opposite free end with an inner curved surface for engaging a lower part of the outer contour of the main pipe with the arms in their closed position, each arm having an outer shoulder between its ends;

a bolt threaded into each threaded bore of said main body; and an arm retainer mounted for free movement on each threaded bolt, each arm retainer having opposite downwardly facing pusher ends engaged with said shoulders of said clamping arms so that rotation of said bolts moves said arm retainers towards said main body to move said arms from their open position to their closed position to engage the main pipe.

2. A clamping device according to claim 1, including a first elastic member having a non-circular hole therein seated in each of said recesses of each of said support sections, each rotary shaft of each arm having a non-circular shape corresponding to said non-circular hole and seated in a non-circular hole of one of said first elastic members, said non-circular hole being oriented for elastically holding its clamping arm shaft in a position to elastically hold said arms in their open position, and a second elastic member engaged between said main body and each of said arm retainers for holding each arm retainer elastically away from each pair of clamping arms respectively, each second elastic member also being engaged over said first elastic member of each pair of arm shafts and over said one end of each pair of arms for holding said first elastic members and said one end of each arm down.

3. A clamping device according to claim 2, wherein said non-circular shape of said arm shafts and said hole all comprise a polygonal shape.

4. A clamping device according to claim 3, wherein each clamping arm has a bent arc shape, said shoulder of each arm being at an outer corner of said bent shape, each downwardly facing pusher end of each arm retainer comprising a downwardly extending thickening of said arm retainer at opposite ends of said arm retainer.

5. A clamping device according to claim 4, wherein each first elastic member substantially has the shape of the letter A and has an outer shape corresponding to a shape of each recess into which each first elastic member is engaged, said second elastic members each having a cylindrical sleeve shape and being engagd around one of said bolts.

* * * * *